United States Patent Office 2,854,684
Patented Oct. 7, 1958

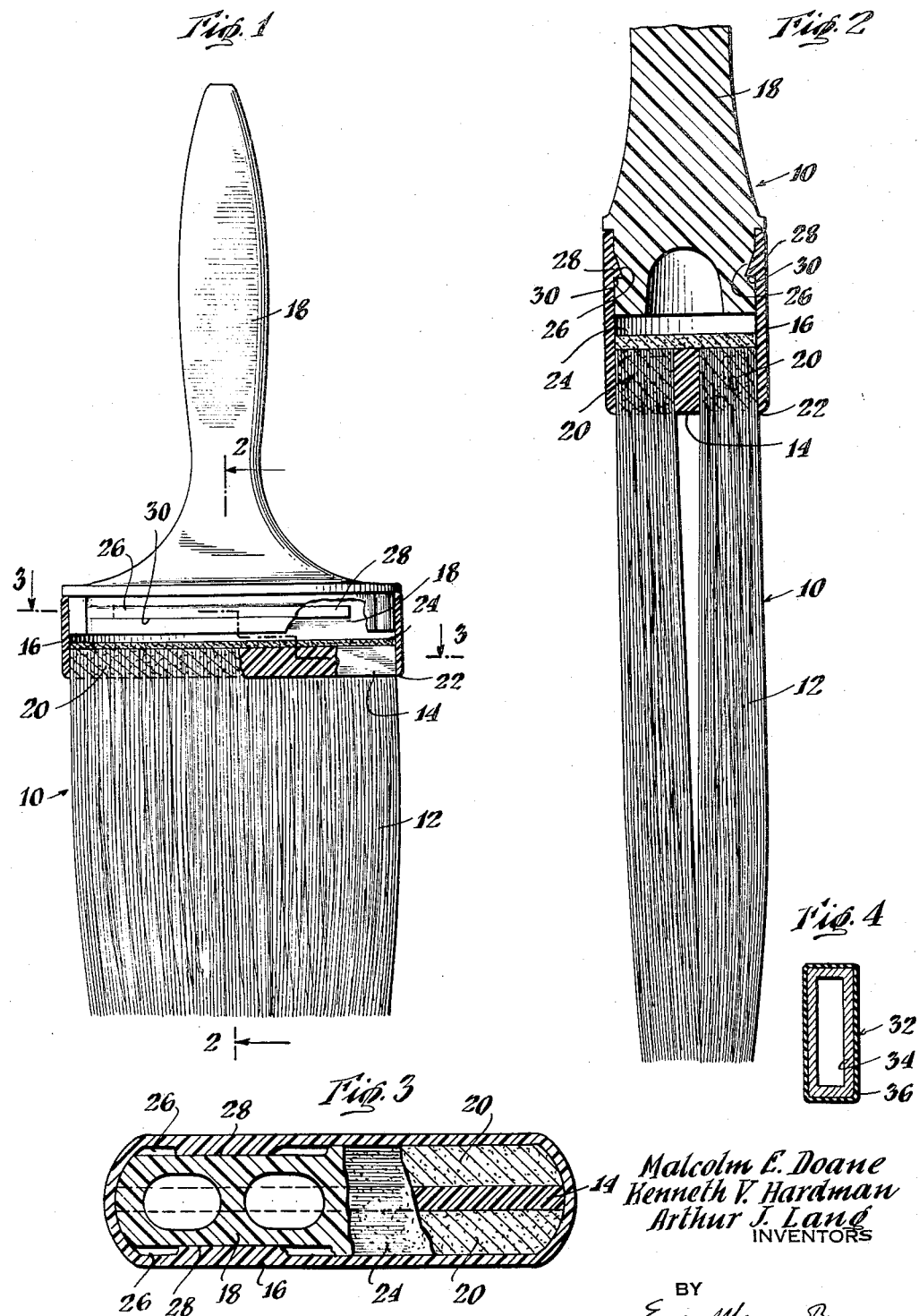

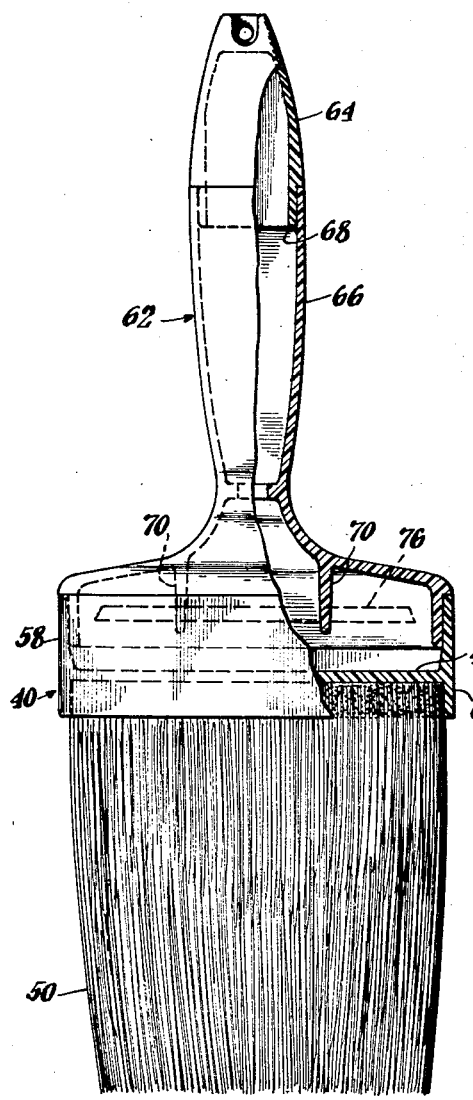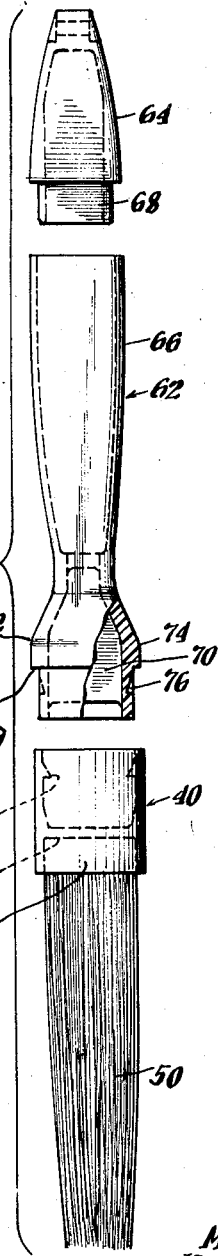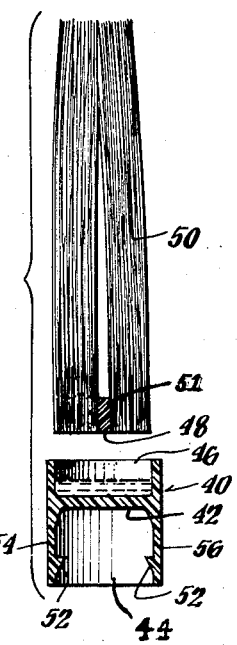

2,854,684

PLASTIC BRUSH

Kenneth V. Hardman, Upper Montclair, Arthur J. Lang, Cedar Grove, and Malcolm E. Doane, Upper Montclair, N. J., assignors to H. V. Hardman Company, Inc., a corporation of New Jersey Application November 4, 1954, Serial No. 466,718

6 Claims. (Cl. 15—193)

This invention relates to an improvement in the manufacture of brushes and in particular to an improved construction for paint brushes of the type in which the bristle knot and ferrule are bonded together into an integral structure.

The type of brush to which this invention relates is described in United States Patent No. 2,648,861, issued August 18, 1953. As there described, the bristle knot is bonded to a plastic ferrule by means of a cement which has solvent action on the ferrule so that the plastic material of the ferrule is plasticized, softened or dissolved in part by the cement of the bristle knot and thereby united and made an integral part thereof. By amalgamating the bristle knot and ferrule together in this way the assembly has high resistance to the solvent action of paints and paint solvents and great structural strength is achieved which materially prolongs the life of the brush.

Although the useful life of the brush far exceeds that of conventional brushes which employ ordinary adhesives and metal ferrules, we have now found that the structure of the brush may be materially improved in certain respects. One improvement in the structure of the brush involves the wooden handle. We have discovered that after the brush has been in use over a prolonged period of time, the wooden handle expands, swells, and tends to crack the ferrule or pull it away from the bristle knot. The plastic material of the ferrule is so rigidly held by the bristle knot in our brush that it cannot stand any appreciable expansion, especially along the line at the top of the bristle knot.

We have now been able to overcome this expansion problem and materially increase the effective life of our brushes by making the handle of a plastic material which is substantially insoluble in paint oils and paint solvents and non-swelling in water. For example, the handle may be made of thermosetting or thermoplastic materials, such as nylon, styrene, or phenolic molding powders, preferably those having high impact strength.

Particular attention must be given to the selection of the plastic material for the handle. For example, in those cases where the handle and bristle knot assembly are to be heated to set the cement, then it is desirable to make the handle and ferrule of the same plastic material. If the handle and ferrule are made of different plastic materials, then the material selected for the handle should have approximately the same coefficient of shrinkage as the plastic material of the ferrule so that the handle will not shrink away from the ferrule or create stresses in the ferrule which may crack it when the assembly is cooled after curing the cement. But, on the other hand, if the handle is inserted into the ferrule after heat treatment, then the coefficient of shrinkage is unimportant and the handle need only be made to fit snugly into the ferrule. Further, the handle must be firmly anchored in place in the ferrule. This may be done by locking the handle and ferrule together by adhesive or mechanical means, and preferably by means of a combination of mechanical and adhesive means which gives a brush of extremely rugged construction. Mechanical locking of the handle in the ferrule is achieved in our structure by means of a notch positioned on either side of the handle which is adapted to receive a corresponding saw-tooth protuberance on either side of the ferrule.

One advantage of this construction is that metal parts such as nails, screws, rivets, and the like, which tend to rust or loosen up in use, are eliminated from the structure of our brush, and although such non-metallic handle and ferrule combinations have been previously suggested they are ordinarily made up in one piece. A one-piece structure has its drawbacks, particularly in connection with the use of plastic materials. For example, a one-piece plastic handle and ferrule combination is difficult to mold and the cost of molding such one-piece unit makes the brush too expensive for practical commercial use. Secondly, if the one-piece unit is made so that it will fit into the hand in the same way that conventional brushes do, it is so heavy that it is awkward to use. The one-piece units also impose special problems in the bonding and setting of the bristles and this further increases the cost of such a brush. Accordingly, an important factor in the structure of our brush and one that has materially contributed to its commercial success is the fact that the handle and ferrule combination is made up of two separate units that may be locked together without the use of metal parts. Another advantage of a two-piece handle and ferrule combination is that different colored plastic materials may be employed for the handle and ferrule which gives a color break and materially improves the appearance of the brush. Further, individual color combinations may be established for designating brushes intended for use with a particular paint or paint solvent.

The construction of our improved brush is best understood by reference to the accompanying drawings in which:

Fig. 1 is a plan view of our improved brush partly broken away to illustrate its construction;

Fig. 2 is a sectional view on line 2—2 of Fig. 1;

Fig. 3 is a sectional view on line 3—3 of Fig. 1;

Fig. 4 illustrates a modified form of the bristle spacer strip of Fig. 1;

Fig. 5 is a front view of the preferred form of the brush of our invention, cut away in part to show its construction;

Fig. 6 is a side view of the brush of Fig. 5 with the handle and ferrule separated; and Fig. 7 is a side view of the ferrule of Fig. 5 with solvent cement therein ready to receive the butt end of a pack of bristles. In this figure the ferrule of Fig. 1 is turned upside down.

Referring now to the drawings, brush 10 is made up of bristles 12, spacer strip 14, a ferrule 16 and handle 18. Handle 18 may be made of a solid block of plastic material, as shown in the drawings, or it may be of hollow construction as shown in the preferred form of our invention in Fig. 5. The butt ends of bristles 12 are assembled into a bristle knot 20 and the bristles in the knot may be separated by one or more spacer strips 14, depending upon the number of bristles in the brush. The bristle knot is cemented into the ferrule by means of a special solvent cement later described, and cementing is ordinarily restricted to a zone extending from the top of the bristle butts to the line at the bottom of the ferrule as indicated at 22. If desired, a cap 24 may be applied to cover the bristle knot.

Turning now to the handle, we have found that an extremely rigid and highly effective mounting for the handle may be achieved by means of a pair of notches or grooves 26, each of which is positioned lengthwise along the side of the lower end portion of the handle which is adapted to fit into the ferrule. As shown, grooves 26 preferably extend lengthwise along a major portion of the side of the handle from one end to the other (see Fig. 1) and they are adapted to receive and hold a pair of sawtooth protuberances 28 which are positioned along each interior side wall of the ferrule 16. The saw-tooth protuberances are preferably made to fit snugly into grooves 26, and although the exact height of protuberances 28 is optional they must be kept small enough so that the ferrule will not crack or pull away from the bristle knot when the handle is inserted into the ferrule. For best results the height of the protuberances 28 may be in the neighborhood of 0.03 inch for a brush 4 inches wide. Of course, the height of the protuberances may be increased or decreased in proportion to changes in the size of the brush. It is to be noted that the height of protuberances 28 is greatest along the bottom edge (Fig. 2), and this is of particular advantage in that it forms a shoulder 30 which when seated in groove 26 substantially eliminates any tendency for the handle to wobble in use.

The type of cement employed for anchoring the bristles in our brush or for locking the handle in the ferrule is highly critical and the cement must be one that is a solvent for the plastic material of the ferrule and handle. By "solvent" we mean that the plastic materials of the ferrule or handle must be plasticized, softened or dissolved in part by the solvent cement to the extent that the cement and plastic materials become united into an integral structure. For example, after the bristle knot is set in the ferrule there should be no sharply defined interface between the cement of the bristle knot and ferrule and the interface is either replaced by a solid solution of variable composition, a new chemical composition, or by a composition formed by uniting or amalgamating the solid materials as in those cases where the solvent cement is vaporized during heat treatment of the assembly. Although bonding of the material is caused by the solvent action of the cement itself, the solvent cement is substantially non-reactive chemically with the solid plastic materials. Some examples of such solvent cements are meta- or para-cresol, mono tertiary butyl cresol, orthophenyl phenol, dihydroxy benzene polyphenols such as resorcinol, and any of the isomeric xylenols. These solvents may be used alone or mixed with one another. Plastic material may be mixed with our solvent cement. The plastic may be one of the kinds listed hereinbelow for the bristles and the ferrule, and it is preferably the same kind used in the construction of the bristles. Adding plastic material to the solvent cement is of particular advantage where the cement is one of low viscosity. In such case the plastic material may be used to regulate the viscosity of the solvent to control penetration down into the bristles. Other high-boiling point solvent cements selected in accordance with the known solubilities of the solid materials of the bristle and ferrule may be employed. For example, the solvent cement may be a high boiling point ortho hydroxy diphenyl in conjunction with nylon ferrules and bristles, or, in the case of the acetate ferrules and bristles, cyclohexanone. All of the solvent cements are substantially non-reactive chemically with the material of the ferrule and handle but have sufficient solvent action so that they bite into the solid plastic material to plasticize, soften or dissolve it so that the bristle knot, ferrule and handle are united into an integral structure.

As to materials, the bristles, spacer strips, ferrule and handle may be made of thermosetting or thermoplastic materials. But it is an essential feature of our invention to select a plastic material for the ferrule which responds to the solvent action of the cement so that the surface of the ferrule becomes plasticized, softened or dissolved to the extent that it unites with the cement of the bristle knot to form an integral structure, or, in those cases where the cement is vaporized during setting of the bristles, an integral part of the plastic materials of the bristles. Some examples of thermosetting and thermoplastic materials which we have used with satisfactory results are nylon, cellulose, acetate, cellulose acetate butyrate, methyl methacrylate, polyvinyl or polyvinylidine chloride, and low pressure laminating polyester resins.

As to the bristles, we prefer to use synthetic bristles made with a suitable thermoplastic material which responds to the solvent action of the cement so that the bristles, ferrule and handle may be united into one integral structure. In some cases, however, it may be desirable to use natural bristles such as horsehair, hog, china, protein and the like, and it will be understood that as long as the material in the ferrule responds to the solvent action of the cement, such natural bristles may be used without departing from our invention even though the bristles are unaffected by the solvent action of the cement. In such case, bonding of the bristles is limited to surface action of the ordinary adhesives.

In general, we prefer to make the bristles, spacer strips, ferrule and handle all of the same plastic material, but this is not necessary, and different plastic materials may be selected for each element. In those cases where heat treatment is used to set the bristles, then the temperature coefficient of shrinkage of the ferrule should be at least equal to that of the plastic of the bristles, and if the handle is subjected to any appreciable amount of heat in the assembly, its temperature coefficient of shrinkage should be approximately equal to that of the ferrule.

If the cement is one that sets at room temperature or if the parts are not subjected to any appreciable amount of heat, then the shrinkage characteristics of the materials are not critical and the ferrule need only be made to fit snugly around the bristle knot and the handle and to fit snugly into the ferrule. Of course, contemplated use of the brush will dictate the type of plastic material which should be selected. For a paint brush, the bristles should be insoluble in paint oils and for a lacquer the bristles should be insoluble in the common lacquer solvents. Nylon and certain vinyl compounds, because of their resistance to organic solvents, find wide application in this field.

Any suitable thermosetting or thermoplastic material may be used for the handle when it is locked in place in the ferrule by mechanical means. However, we prefer to make the handle of a plastic material which responds to the solvent action of the cement so that the material of the handle is plasticized, softened or dissolved by the cement and thereby made an integral part of the ferrule bristle knot assembly. In such case it is not necessary to employ mechanical means for holding the handle in place, but for extremely rugged construction that will stand up under the most severe conditions of use we prefer to use a solvent cement as described hereinabove and mechanical means for holding the handle in place in the ferrule.

In assembling the bristles in the ferrule, enough solvent should be used to wet all of the surfaces that are to be united, including adjacent surfaces of the bristle butts, separator strips and the inside wall of the ferrule, but there should not be enough cement to convert any of these parts of the brush to flowable condition. We have used to advantage about 1.5 to 3.5 cc. of the solvent cement for application over the butt ends of the bristles having an area of surface of 3 square inches in a ferrule about four inches wide. The solvent cement may be brushed, sprayed or poured over the tips of the uncoated bristle butts, but we prefer to pour the solvent cement over the bristle butts since a more even distribution over the exposed area is thereby insured.

If the solvent is one that requires heat to set the softened plastic material, then the bristle knot assembly is heat-treated. The time of exposure to heat and the temperature will vary, depending upon the particular material used. In general, the time of exposure decreases as the temperature increases. Ordinarily, we prefer to use about 280° F. for a period of about 40 minutes. If the solvent cement is one that will set at room temperature, or one that will set at room temperature in the presence of a catalyst, such as the polyester resins or resorcinol, then the heat treatment is not necessary and the bristle knot assembly is set aside until it is hard enough to handle without destroying the integral structure of the assembly. The plastic handle is thereafter snapped into the ferrule where it is securely held by protuberances 28 of the ferrule which fit snugly into grooves 26 of the handle. If the handle is to be made an integral part of the ferrule, a small amount of our solvent cement is applied on the inside wall of the ferrule before the handle is inserted. This cement for the handle is then cured at room temperature or by heat treatment, depending upon the cement employed.

The following examples illustrate the manufacture of a brush using a solvent cement which is set by heating the assembly above room temperature.

*Example 1*

A nylon bristle pack is weighed out and inserted in a nylon ferrule. The pack is sized out to the depth of adhesion required, as for instance, ⅜ inch. One or more nylon spacer strips are inserted in the bristle pack as shown in the drawings and the assembly is placed in a clamp or jig, where it is tightly held. The solvent cement, which in this case is mono tertiary Butyl cresol, is then poured over the exposed surface of the bristle butt ends inside the ferrule. The amount of cresol employed for the bristle assembly of a brush four inches wide and ⅞ inch thick is about 1.8 g. Immediately after pouring the solvent cement over the butt ends of the bristles the assembly is inverted to prevent penetration of the cement down into the bristles beyond the bottom of the ferrule. The inverted brushes are heated and held at a temperature of about 280° F. for about 40 minutes to cure and set the softened nylon material of the bristles, spacer strip and ferrule into an integral structure. Excess cresol evaporates from the assembly during heat treatment. After about 40 minutes the brush is cooled, care being taken not to bend or in any way damage the warm nylon bristles. After cooling, a plastic handle is snapped into the ferrule, where it is held by means of the saw-tooth protuberances of the ferrule and the corresponding grooves in the handle, all as shown in the drawings. Brushes made as described show no separation of the ferrule from the bristle knot or separation of the bristles from each other, or from the spacer strips, even after use over a prolonged period of time.

In the preferred form of our invention, the plastic handle is made an integral part of the ferrule. This may readily be done by selecting the same plastic material for the handle and ferrule. Thus, in the example given above, the handle may be made of nylon and that portion of the handle that fits into the ferrule is then coated with the mono-tertiary butyl cresol and snapped into place prior to heat treatment. In such case the handle is heat treated along with the ferrule bristle knot assembly, and when this is done the handle is also made an integral part of the finished assembly. Heat treatment is carried out by heating the assembly and holding it at a temperature of about 285° F. for forty minutes. It will be understood that if the plastic handle is made an integral part of the ferrule by means of our solvent cement it is not then necessary to employ the saw-tooth protuberances or other mechanical means for holding the handle in place. If, however, extremely rugged construction is desired, then the combination of mechanical means and solvent cement may be used to advantage for holding the handle in place.

It will be noted that the spacer strip 14 in Fig. 1 of the drawings is made up of a solid block or strip of plastic material. Although this is satisfactory for our purpose the spacer strip may also be made hollow, as shown in Fig. 4. As there shown, the spacer strip 32 comprises a hollow core of suitable kraft paper 34, or the like, which is covered with a thin wall of plastic material, such as nylon, as indicated at 36. Coating the paper core with plastic material may be readily carried out either by wrapping a thin film of the plastic material around the core, or a die may be used for extruding a thin wall of plastic material around the core directly.

The following examples illustrate some possible combinations of plastic materials and solvent cements which we have used with excellent results. In each case the procedure followed in manufacturing the brush was described in the example given above, and in each case the plastic material of the bristles, spacer strips, ferrule and handle all respond to the solvent action of the cement so that each of the separate elements are united into an integral structure.

| Bristles | Spacer Strips | Handle and Ferrule | Solvent Cement | Temperature and Time of Heat Treatment |
| --- | --- | --- | --- | --- |
| nylon | nylon | nylon | m-paracresol | 275° F. for 7 to 40 minutes. |
| cellulose acetate | cellulose acetate | ___do___ | meta cresol | 275° F. for about 30 minutes. |
| Do | nylon | ___do___ | ___do___ | Do. |
| methyl methacrylate | methyl methacrylate | methyl methacrylate | catalyzed [1] methyl methacrylate. | 160° F. for about 4 hours. |
| cellulose acetate | cellulose acetate | cellulose acetate | cyclohexanone | 320° F. for about 40 minutes. |

[1] The catalyst usually employed is benzoyl peroxide.

The following example illustrates the use of solvent cements which may be cured and set at ordinary room temperature.

*Example 2*

A nylon bristle pack is weighed out and inserted in a nylon ferrule. The pack is sized out to the depth of adhesion required, as for example, ⅜ inch. One or more nylon spacer strips are inserted in the bristle pack, as shown in the drawing, and the assembly is placed in a clamp or jig, where it is tightly held. In this case the solvent cement is a cold setting resorcinol resin which is a commercial product readily available on the open market. It may be identified as a resorcin formaldehyde resin having insufficient aldehyde groups to cause the resin to set to an infusible insoluble state. The resin includes a suitable catalyst and it is made to set up at room temperature by adding a setting agent containing either active methylene radicals or active methylol radicals such as are present in a 37% solution of formaldehyde. Such cold setting resorcin is sold by Koppers Company under the trade name Penacolite G1124. The resorcin formaldehyde resin and formaldehyde catalyst are mixed and then the mixture is poured over the exposed bristle butts in the ferrule. The amount of resorcinol material used is about 5 g. for the bristle knot in a brush ⅞ inch thick and 4 inches wide.

The brush is then set aside and in about ten minutes at room temperature the resorcinol material becomes tacky. In about one hour the resorcinol is hard enough so that an additional amount of resorcinol may be poured over the bristle butts as a cap. Approximately 1.5 to 3.0 g. of material is used for the capping. In about six hours the resorcinol is hard enough so that a plastic handle may be snapped in place in the ferrule without danger of destroying the integral structure of the ferrule bristle knot assembly.

The handle may be made of thermoplastic or thermosetting plastic materials and it is held in place by the sawtooth protuberances of the ferrule and corresponding grooves in the handle. As in the case of Example 1, the plastic handle may be made an integral part of the ferrule by selecting a plastic material which responds to the solvent action of the cement.

The following example illustrates the use of natural bristles and thermosetting plastic materials for the ferrule wherein the ferrule and bristle knot are united into an integral structure by means of a cement having solvent action on the thermosetting materials.

*Example 3*

A bristle pack of hog bristles is weighed out and inserted into a ferrule made of several layers of glass fabric held held together by means of a low pressure laminating polyester resin. The bristles are seperated by one or more spacer strips of glass fibers laminated with polyester resin and the pack is sized out to the depth of adhesion required, as for example, ¼ inch. The solvent cement in this case is the same polyester resin material used in the ferrule which is sprayed or poured on the surface of the butt ends of the bristle pack in the ferrule. The amount of cement used is about 5.0 g. for the bristles in a 4-inch paint brush. In about 20 minutes the cement has hardened sufficiently so that a capping of the polyester cement may be applied over the bristle knot. For a 4-inch brush this requires about 10 g. of resin. The assembly is then set aside and held at room temperature until the cement is hard enough so that a plastic handle may be snapped in place in the ferrule without destroying the integral structure of the bristle knot ferrule assembly.

Polyester resins are readily available on the open market and the ones which are suitable for use in the manufacture of our brushes are known in the art as low pressure polyester laminating resins. These are characterized by the fact that they may be cured at room temperature and at ordinary atmospheric pressure. These polyesters are further characterized by the presence of unsaturated carbon bonds which undergo polymerization during cure without liberation of water. The resins are made of three groups of compounds: acids such as maleic, furmaric, itaconic and phthalic; alcohols or glycols such as allyl alcohol, ethylene glycol and diethylene glycol; and unsaturated hydrocarbons such as styrene, cyclopentadiene, and similar compounds. The polyester is prepared by condensation of the acid and alcohol and it must contain at least one unsaturated compound. This may be either an unsaturated alcohol or acid. The resulting unsaturated polyester is then capable of polymerizing upon cure to form cross linked three-dimensional structures. The polyester is mixed with an unsaturated hydrocarbon liquid such as styrene which acts as a solvent vehicle for the resin. Upon the addition of a suitable peroxide catalyst, such as MEK peroxide and benzoyl peroxide with cobalt naphthanate as an activator, the resin is made to cure at ordinary room temperatures and pressures. For our purpose the polyester resin is thinned with styrene until it is fluid enough to give the desired penetration down into the bristle knot. Ordinarily 30 parts of styrene are used for 100 parts of the polyester resin. It will be understood that any of the polyester resins which set at ordinary room temperatures and pressures and which in liquid form are capable of exerting solvent action on the solid polyester material of the ferrule as described hereinabove, may be used as a solvent cement in the manufacture of our brushes. These polyester resins are sold on the open market under the trade names Laminac, Paraplex, and Vibrin.

As in previous examples, the handle may be made of any suitable thermoplastic or thermosetting material, and it may be held in place by adhesive means or by the saw-tooth protuberances on the ferrule. A combination of mechanical and adhesive means may be employed if desired.

In Figs. 5 through 7 we show a preferred form of the improved paint brush of our invention. This preferred form of our invention is especially adapted for use with solvent cements that cure at room temperature and atmospheric pressure. In general, these cements are of low viscosity so that it is extremely difficult to control penetration of the cement down through the bristle knot, and as frequently happens, the cement flows down below the bottom of the ferrule, leaving icicles which tie the bristles together. When this occurs the brush is not a commercial item and must be discarded.

We have solved this problem by means of a special ferrule 40, shown in Figs. 5 through 7. Ferrule 40 consists of an enclosure open at the top and bottom which has a partition 42 that separates the ferrule into an upper chamber 44 and a lower chamber 46. The enclosure may be of any desired form such as a circle or an oval. Normally it will be in the general form of a four-sided rectangle as shown in the drawings. Upper chamber 44 is adapted to receive a handle for the brush and lower chamber 46 receives and holds the butt end 48 of bristle pack 50. As most clearly shown in Fig. 6, in cross-section the preferred form of the ferrule of our invention is in the general form of an H and the length of the upper and lower chambers is approximately equal so that the length of the surfaces against which the handle bears during painting is co-extensive with the length of the bristle knot. As a result, side pressure of the handle against the H ferrule is evenly distributed throughout the length of the bristle knot and this so reduces the pressure per unit of area that we are able to make the wall of the ferrule thin without danger of its splitting open when the brush is in use. Further, the wall of the lower chamber is of uniform thickness and the interior wall of the lower chamber is smooth and even throughout without undulations, which is important since the bristles can then be uniformly distributed in the ferrule so that paint will be evenly distributed on the work surface. In order to assemble bristle pack 50 in ferrule 40, the ferrule is first turned upside down so that chamber 46 is positioned on top. The selected solvent cement is then poured into chamber 46 and immediately thereafter the butt end of bristle pack 50 is inserted down into the chamber. Preferably, the bristle pack is pushed down into chamber 46 until the butt end 48 of the pack rests against partition 42. By inserting bristles into chamber 46 the solvent cement is forced to flow upwardly and fill the interstices between the individual bristles. This is a dipping process so that depth of penetration of solvent cement into the bristle pack is controlled, which cannot be done where the cement is poured on top of the butt end of the pack. It is to be noted that the individual bristles in pack 50 are loose before they are inserted into chamber 46 of ferrule 40. The bristles may be held together in pack form as shown in Fig. 7 by hand, and if desired a flexible metal collar (not shown) may be wrapped around the butt end of the bristles to assist in squeezing the bristles together in pack form. After the bristle pack is in place in chamber 46 a spacer strip 51 is ordinarily pushed down through the bristle pack and into chamber 46 of ferrule 40. The spacer strip tightly wedges the bristles in place in the ferrule. Of course the metal collar is removed after the bristle pack is in place in chamber 46 of ferrule 40. The amount of solvent cement employed is just enough to fill the interstices between the individual bristles within the area of chamber 46 without extending up into the pack beyond the limit of the ferrule. This ordinarily requires about 4.6 gms. for a brush four inches wide and ⅞ inch thick when using natural bristles, and about 2.8 gms. when using nylon bristles.

By dipping the butt end of the bristle pack into the pool of selected solvent cement in ferrule 40 we achieve an extremely uniform flow of cement upwardly into the bristle pack and since the liquid cement tends to level off in a straight line across the ferrule, penetration of cement into the bristle pack is extremely uniform and this eliminates the formation of icicles in the bristle pack beyond the edge of the ferrule. It can be seen that ferrule 40 is of extremely lightweight construction, which is of great advantage when painting, and partition 42 so strengthens and reinforces the walls of the ferrule that it does not swell or buckle when the solvent cement is cured. As a result, there is no need for clamping the ferrule in a jig which is required in the case of the ferrule of Fig. 1. The partition also provides a base or foundation for the bristle pack to which the butt end 48 of the pack is securely anchored by means of the solvent cement. As a result, the sides and but end of the pack are all anchored in place in the ferrule to give an exceptionally strong anchorage for the bristle pack and this eliminates any tendency for the pack to loosen in the ferrule. Further, partition 42 prevents swelling of the bristle pack when the brush is in use. Curing and setting the solvent cement is carried out as previously described hereinabove.

Ferrule 40 may be made of any of the plastic materials described above for the open type ferrule of Fig. 1 and the selected solvent cement may be one of those described in connection therewith. Preferably ferrule 40 is made of nylon plastic material and the preferred solvent cement is a dihydroxy benzene polyphenol, such as resorcin formaldehyde resin described above in Example 2. Excellent results have also been achieved with the phenol aldehyde condensation products and the so-called epoxy resinous condensation products that cure at room temperature. For example, with a nylon ferrule 40 we use an A stage phenol formaldehyde resin and catalyze and cure it at room temperature with phosphorous acid. This solvent cement is a commercial product sold on the open market. The base resin is sold under the name Durez 7421A and the acid catalyst under the name Durez 7422. Since the epoxy resins do not give the required solvent action with nylon, such cements are used with ferrules made of epoxy resinous material. In such case the solvent cement may be the same as the epoxy resin used in the ferrule but in liquid form. Epoxy resins may, for example, be formed by reacting together in known manner bisphenol-A with an epoxy compound such as epichlorohydrin. The resulting liquid condensation product may be cured at room temperature with an amine such as diethylene triamine. The bristle pack 50 may be formed of synthetic or natural bristles as previously described above.

Turning now to the handle for ferrule 40, the handle is made of a suitable plastic material and it may be anchored in place in the upper chamber 44 of ferrule 40 by any convenient means. We prefer, however, to use a combination of adhesive and mechanical means as previously described herein for the brush of Fig. 1. In such case we provide a pair of saw-tooth protuberances 52, each of which is positioned along the side walls 54 and 56 of ferrule 40 within upper chamber 46. Protuberances 52 extend lengthwise along a major portion of side walls 54 and 56 and stop just short of the end walls 58 and 60 of ferrule 40. The saw-tooth protuberances are of the same construction as those shown in Fig. 1. If desired, handle 18 may be anchored in place in ferrule 40 in the same way as described in the brush of Fig. 1. It will be understood that the adhesive employed for anchoring the handle in place may be an ordinary adhesive or one of the solvent cements described herein.

For a lightweight, inexpensive brush, we prefer however to use the hollow handle 62 as shown in Fig. 5. The handle may be made of any suitable thermosetting or thermoplastic and it is preferably made of nylon. For economy of materials and convenience of molding, handle 62 is made up of two sections, a top section 64 and a bottom section 66. The two sections give an additional color break in the handle of the brush which in connection with the color break provided by the separate handle ferrule combination, makes a great number of individual color schemes possible with the brush of our invention. The top section 64 is provided with a tongue 68 that is made to fit snugly into the hollow interior at the top of bottom section 66. Tongue 68 may be held in place in bottom section 66 by means of an ordinary adhesive or by means of one of our solvent cements. The lower portion of bottom section 66 of handle 60 is provided with a shoulder 69 on the exterior surface thereof which is approximately as wide as the thickness of the top of the wall of upper chamber 44 of H ferrule 40 so that the top of the wall of chamber 40 may be positioned against shoulder 69. This assists in anchoring the handle in place in the ferrule and guards against the handle wobbling in use. The bottom section 66 of handle 60 is also provided with a pair of reinforcing ribs 70 that extend across between the two side walls 72 and 74, respectively, of the handle. Each side wall 72 and 74 has a groove or notch 76 which as shown extend lengthwise along a major portion of the side wall from one end to the other. The grooves 76 are adapted to receive and hold the saw-tooth protuberances 52 positioned on each side wall of chamber 44 of ferrule 40. Grooves 76 are of the same construction as those described in connection with the brush of Fig. 1, and handle 60 may be securely anchored in place in chamber 44 of ferrule 40 in the same way as described for the brush of Fig. 1. It is to be noted that ribs 70 limit compression of side walls 72 and 74 of handle 62, and we rely upon the flexibility of the top portion of the side walls of chamber 44 for snapping protuberances 52 into position in notches 76. Chamber 44 of the ferrule forms a deep socket for handle 62 and the side walls of chamber 44 extend up over a substantial portion of the base of the handle and are anchored in place against shoulder 69 so that there is no tendency for these members to wobble because of pressure applied against the side of the bristle pack when the brush is in use.

The finished brush is of extremely lightweight construction and the brush has balance and feel that cannot be obtained in conventional metal ferrule brushes now on the market. Balance and feel of the brush are a function of the weight of the brush and depth of ferrule. Lightweight construction is achieved by molding the handle and ferrule as separate units so that they can be made hollow, and a deep ferrule without any appreciable weight is achieved by positioning a partition 42 down within the interior of ferrule 40 where it serves as a foundation or base for the bristle knot.

It will be understood that partition 42 need not present a flat surface foundation for the base of the bristle knot, and if desired, such surface may be convex to form a curve between the end walls 58 and 60 of ferrule 40. When the bristle butts are positioned against such a convex surface the tips of the bristles will be held in a curve with the longest bristles in the center of the brush, giving a so-called cup chisel effect. Although we have described partition 42 as a continuous partition separating ferrule 40 into two separate chambers, if desired small holes may be drilled in the partition to provide an air vent for the hollow space formed by inserting the base of the handle in chamber 44 of ferrule 40. If this is done the handle is of course inserted into chamber 44 before the bristle pack is assembled in the ferrule. The air vent holes in partition 42 must be made small enough so that no appreciable amount of cement will pass through the partition. Any small amount of cement that does ooze through the air holes will harden and key the bristle knot and cement to the partition.

This application is a continuation in part of our copending application Serial No. 408,943, filed on February 8, 1954 and now abandoned.

It will be further understood that it is intended to cover all changes and modifications of the examples of our invention herein chosen for the purpose of illustration which do not constitute departures from the spirit and scope of our invention.

What we claim is:

1. A brush comprising a plastic handle, a plastic ferrule and bristles packed at their butt ends within the ferrule, means for locking the handle in the ferrule, each of said three elements initially being separate units which are united together in brush form by means of an adhesive material which anchors the bristle butts to each other to form a bristle knot, said material being the product formed by applying a solvent cement to the bristle butts which has solvent action on the plastic material of the ferrule and which is substantially non-reactive chemically with the plastic material of the bristles and ferrule whereby the bristle knot is united into an integral structure with the ferrule, in which the ferrule is initially in the form of an enclosure open at the top and bottom which has an imperforate partition positioned therein that divides the ferrule into an upper chamber and a separate lower chamber, said ferrule in cross-section being in the general form of an H with the upper and lower chambers being approximately equal in length and said lower chamber having a wall of uniform thickness with the interior of said wall being smooth and even without undulations therein, said upper chamber being adapted to receive the handle for the brush and said lower chamber being adapted to receive the bristles and said ferrule and partition being a molded piece of unitary structure made of the same plastic material throughout.

2. A ferrule for a paint brush comprising an enclosure open at the top and bottom which has an imperforate partition positioned therein that divides the ferrule into an upper chamber and a separate lower chamber, said ferrule in cross-section being in the general form of an H with the upper and lower chambers being approximately equal in length and said lower chamber having a wall of uniform thickness with the interior of said wall being smooth and even without undulations therein, said upper chamber being adapted to receive the handle for the brush and said lower chamber being adapted to receive the bristles and said ferrule and partition being a unitary structure made of the same material throughout.

3. A brush comprising a plastic handle, a plastic ferrule and bristles packed at their butt ends within the ferrule, means for locking the handle in the ferrule, each of said three elements initially being separate units which are united together in brush form by means of an adhesive material which anchors the bristle butts to each other to form a bristle knot, said material being the product formed by applying a solvent cement to the bristle butts which has solvent action on the plastic material of the ferrule and which is substantially non-reactive chemically with the plastic material of the bristles and ferrule whereby the bristle knot is united into an integral structure with the ferrule, and in which the means for locking the handle into the ferrule comprises a pair of saw-tooth protuberances, each of which is positioned lengthwise along an interior side wall of the ferrule, and a pair of groves each of which is positioned lengthwise along the side of the lower end portion of the handle, said groove being adapted to receive and hold the saw-tooth protuberances of the ferrule.

4. A brush comprising a hollow plastic handle, a plastic ferrule, said ferrule being in the form of an enclosure open at the top and bottom which has an imperforate partition positioned therein that divides the ferrule into an upper chamber and a separate lower chamber, said ferrule in cross-section being in the general form of an H with the upper and lower chambers being approximately equal in length and said lower chamber having a wall of uniform thickness with the interior of said wall being smooth and even without undulations therein, said upper chamber being adapted to receive the handle for the brush and said lower chamber being adapted to receive the bristles and bristles packed at their butt ends within the lower chamber of said ferrule, each of said three elements initially being separate units which are united together in brush form by means of an adhesive material which anchors the bristle butts to each other to form a bristle knot, said material being the product formed by applying a solvent cement to the assembly which has solvent action on the plastic material of the assembly whereby the bristle knot, handle and ferrule are united together into an integral structure and said ferrule and partition being a molded piece of unitary structure made of the same plastic material throughout.

5. A brush as specified in claim 4 in which the upper chamber of the ferrule has a pair of saw-tooth protuberances, each of which is positioned lengthwise along the interior side wall of the said chamber and in which the handel has a pair of grooves, each of which is positioned lengthwise along the side of the lower end portion of the handle, said grooves being adapted to receive and hold the saw-tooth protuberances of the ferrule.

6. A brush comprising a plastic handle, and a plastic ferrule, said ferrule being in the form of an enclosure open at the top and bottom which has a partition positioned therein that divides the ferrule into an upper chamber and a lower chamber, said ferrule in cross-section being in the general form of an H with the upper and lower chambers being approximately equal in length and said lower chamber having a wall of uniform thickness with the interior of said wall being smooth and even without undulations therein, said upper chamber being adapted to receive the handle for the brush and said lower chamber being adapted to receive the bristles and said bristles being packed at their butt ends within the lower chamber of said ferrule, each of said three elements initially being separate units which are united together in brush form by means of an adhesive material which anchors the bristle butts to each other to form a bristle knot, said material being the product formed by applying a solvent cement to the assembly which has solvent action on the plastic material of the assembly whereby the bristle knot, handle and ferrule are united together into an integral structure, said upper chamber of the ferrule having a pair of saw-tooth protuberances each of which is positioned lengthwise along the interior side wall of the said chamber, said handle having a pair of grooves each of which is positioned lengthwise along the side of the lower end portion of the handle, said grooves being adapted to receive and hold the saw-tooth protuberances of the ferrule and said lower end portion of the handle having a shoulder positioned on the exterior wall thereof above said grooves which is approximately as wide as the thickness of the top of the wall of the upper chamber and which is positioned against said top of the wall of the upper chamber to assist in anchoring the handle in place in the ferrule to prevent wobbling of the handle when the brush is in use.

References Cited in the file of this patent

UNITED STATES PATENTS

| | | |
|---|---|---|
| 383,506 | Wagner | May 29, 1888 |
| 925,178 | Hardman | June 15, 1909 |
| 2,116,375 | Aubitz | May 3, 1938 |
| 2,355,744 | Meyers | Aug. 15, 1944 |
| 2,494,537 | Babcock | Jan. 17, 1950 |
| 2,512,997 | Bixler | June 27, 1950 |
| 2,648,861 | Hardman | Aug. 18, 1953 |